May 16, 1967  E. W. GRAHAM  3,319,340
PROFILE INDICATOR AND RECORDER
Filed Nov. 27, 1964  4 Sheets-Sheet 4

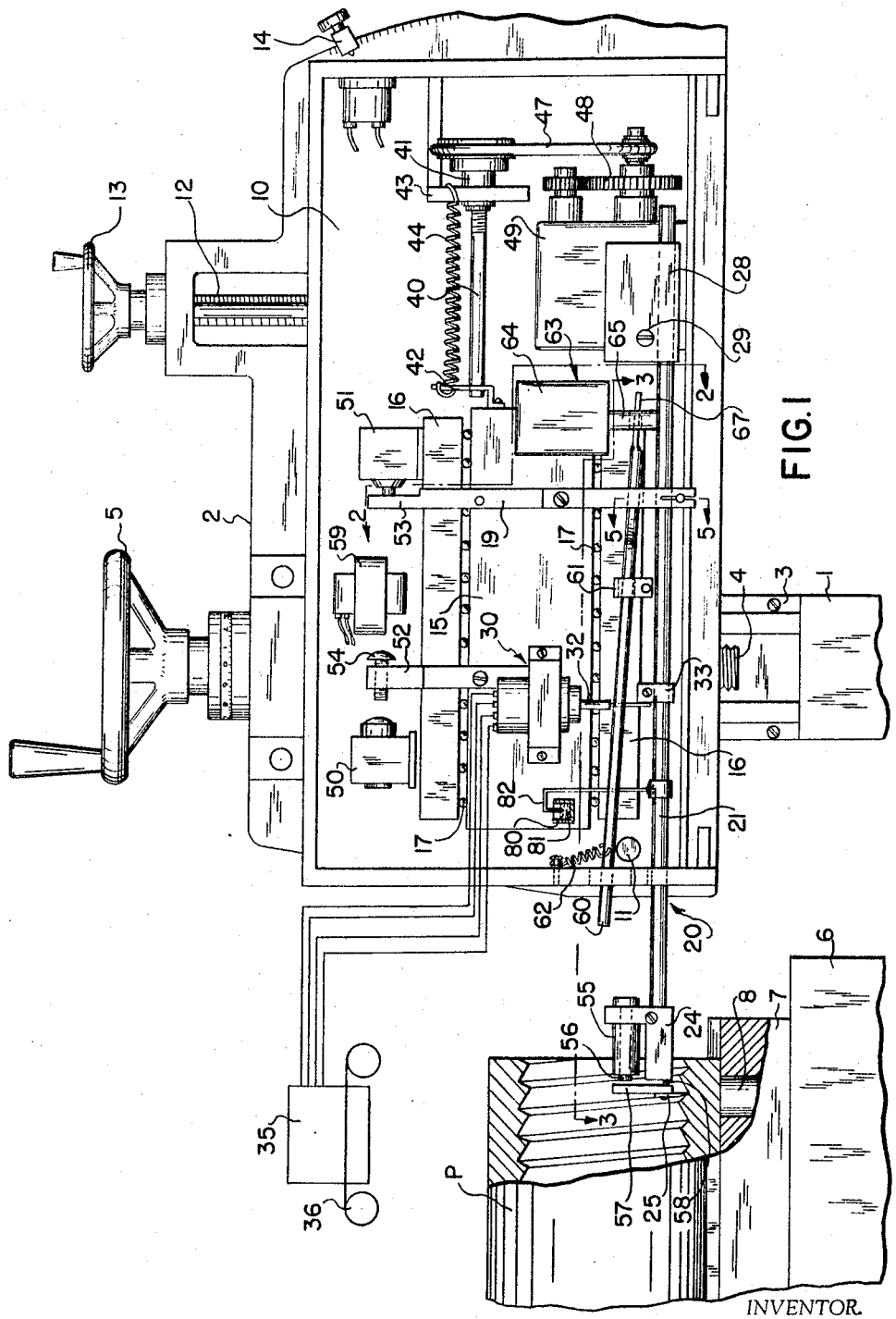

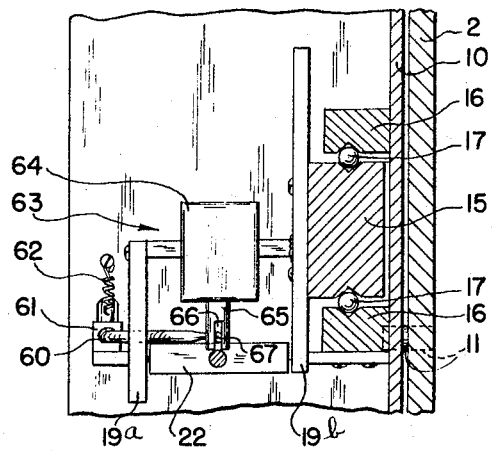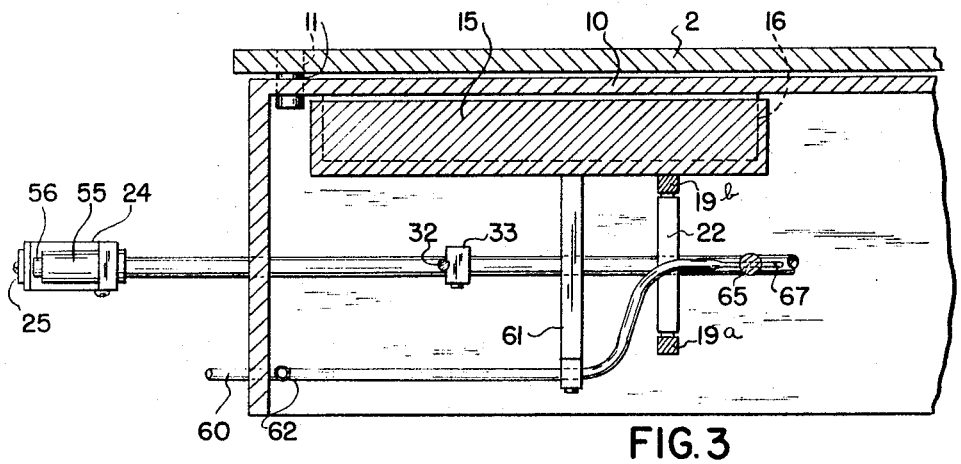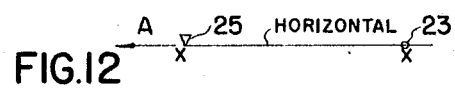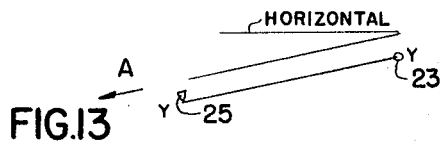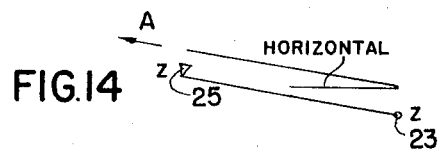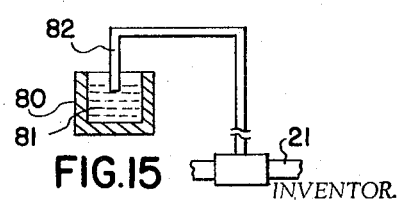
INVENTOR.
ERWIN W. GRAHAM
BY
his ATTORNEY

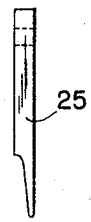
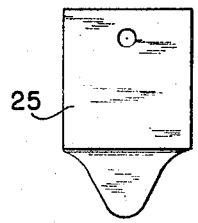
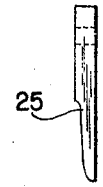
FIG.7    FIG.6    FIG.8
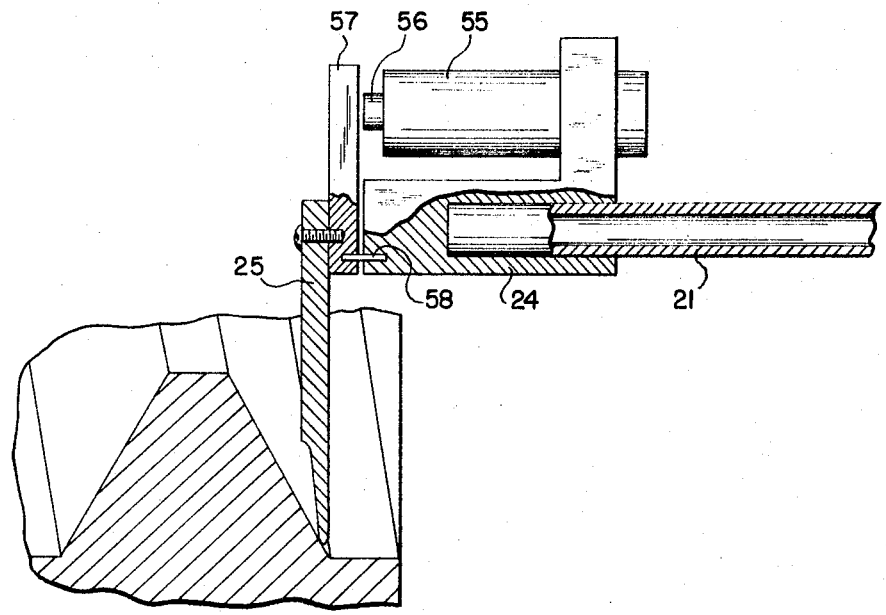
FIG.4
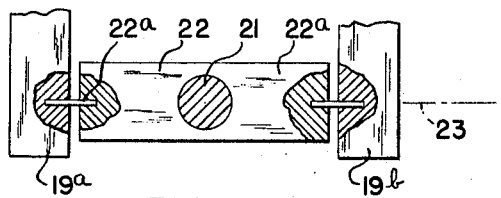
FIG.5

INVENTOR.
BY ERWIN W. GRAHAM
his ATTORNEY

United States Patent Office 3,319,340
Patented May 16, 1967

3,319,340
PROFILE INDICATOR AND RECORDER
Erwin W. Graham, Willoughby, Ohio, assignor to The Pipe Machinery Company, Wickliffe, Ohio, a corporation of Ohio
Filed Nov. 27, 1964, Ser. No. 414,104
5 Claims. (Cl. 33—174)

This invention relates to a profile indicator for indicating profiles of various surfaces and particularly to a profile indicator which has a follower surface arranged to ride on a selected surface of an article, as the follower moves along a preselected path therealong, and thereby produce a signal by which the profile is indicated.

A more specific object is to provide a profile indicator of the general character described in which the signal operates an amplifying visual recorder whereby enlarged or reduced visual records of profiles may be produced.

Another object is to provide a profile indicator which can ride upwardly along steeply inclined, and almost upright, surfaces facing toward the follower as it advances there toward, and also which can travel downwardly along undercut surfaces facing in a direction away from the follower such, for example, as a leading steep flank or an undercut trailing flank of a screw thread.

Another object is to provide a relatively simple precision profile indicator which is mounted on a carrier driven by a microfeed along a predetermined path for traversing a length of surface of which the profile is to be indicated, and which carries a follower that is movable toward and away from the article surface in coplanar paths which are angularly disposed to the predetermined path of the carrier so as to follow the profile thereof.

Another object is to provide such a structure in which operation of the microfeed causes a follower to engage the surface of the article and to remain so engaged until the follower has reached its fully advanced position, whereupon the follower is automatically retracted from the surface and returned to its starting position.

More specifically the profile indicator comprises a carrier mounted for movement along selected predetermined lineal paths and carrying an elongated arm which is rockable relative to the carrier about an axis extending transversely of the paths. The arm carries at one end a follower which can ride on the surface of an article of which the profile is to be taken. The arm is counterbalanced so that the follower rides on the surface of the article. An electric signal means is operated by the arm in response to its rocked positions to provide signals by which the profile is indicated. A preferred form of profile indicator particularly adapted for providing large, accurate, recorded representations of profiles of internal threads is shown for purposes of illustration, it being apparent from this example that the profile indicator is adapted for indicating profiles of surfaces of many types of articles of which the variations in profile range from large to very minute, and all such adaptations are within the scope of the present invention.

Additional specific objects and advantages will become apparent from the following description wherein reference is made to the drawings in which:

FIG. 1 is a front elevation of a profile indicator for obtaining the profile of internal threads, parts thereof being shown in section for clearness in illustration;

FIG. 2 is a fragmentary vertical cross-sectional view of the structure illustrated in FIG. 1, and is taken on line 2—2 thereof;

FIG. 3 is a fragmentary horizontal cross sectional view of the structure illustrated in FIG. 1 and is taken on the line 3—3 thereof;

FIG. 4 is an enlarged fragmentary vertical longitudinal sectional view through a portion of the follower and the internal thread of a coupling being engaged thereby, illustrating their manner of cooperation;

FIG. 5 is an enlarged fragmentary vertical cross sectional view taken on the line 5—5 in FIG. 1, and illustrating the mounting of the follower arm;

FIG. 6 is a front elevation of a blade, such as illustrated in FIG. 4, which is suitably as a follower blade for indicating profiles of internal threads;

FIG. 7 is a right side elevation of the blade illustrated in FIG. 4;

FIG. 8 is a right side elevation, similar to FIG. 7, showing a modification of the blade thereof;

FIGS. 12 through 14 are diagrammatic illustrations showing relations of the follower blade and follower pivot to the direction of advance of the follower for different selected paths of advance, respectively.

Figure 9:
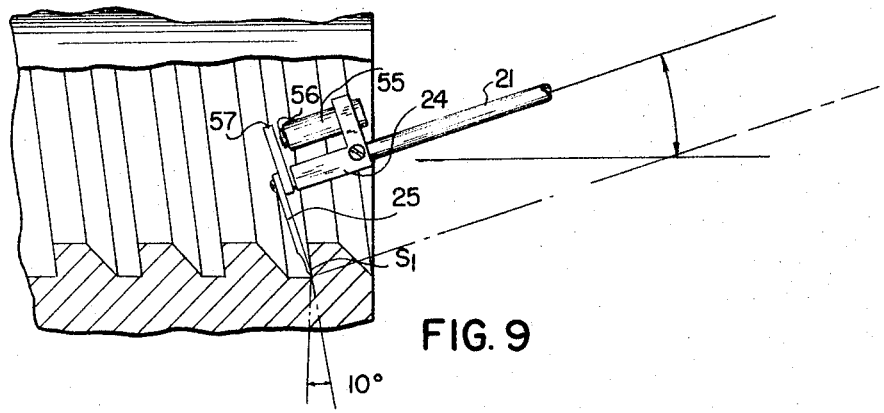
FIG. 9 is a diagrammatic illustration showing the manner in which the follower blade travels along an undercut surface facing away from the direction of advance of the follower.
Figure 10:
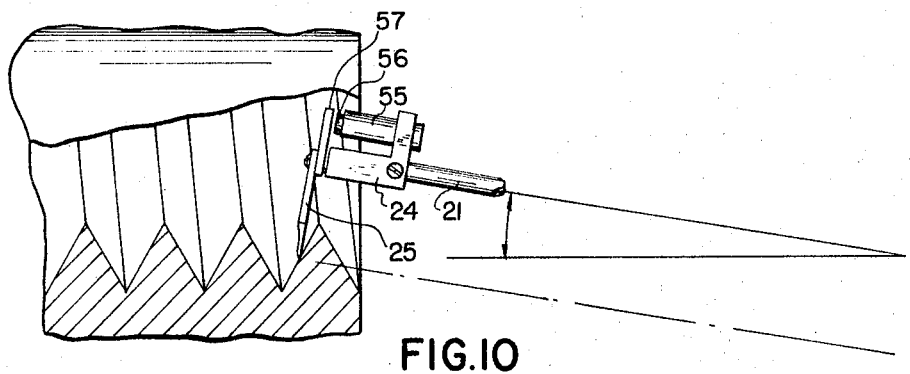
FIG. 10 is a diagrammatic illustration similar to FIG. 9 showing the manner in which the follower blade cooperates with a steep rising surface facing toward the advancing follower.

Referring to the drawings, the invention is shown as embodied in a bench type gauge structure comprising an upright pedestal 1, on which elevating support 2 is mounted in vertical dove tail guide ways 3 for movement in an upright lineal path. The elevating support 3 may be moved to raised or lowered positions, selectively, by any conventional means, such as a suitable jack screw 4 operable by hand wheel 5.

The pedestal 1 may be disposed adjacent to a suitable article support 6 on the top of which is a work piece supporting platform 7. The platform 7 preferably is connected to the support 6 by a suitable vertical pivot 8 for swinging about the pivot horizontally. For illustration, the platform 7 is shown as carrying an internally threaded pipe coupling P with its axis disposed horizontally and intersecting the axis of the pivot 8.

Mounted on the elevated support 2 is a supporting frame 10 in the form of a rigid plate. The frame 10 is connected to the support 2 by a horizontal pivot 11 for swinging relative to the support 2 in a vertical plane. For swinging the frame 10 about the axis of the pivot 11, a suitable screw 12, operated by a handwheel 13, is mounted on the elevating support 2 and is connected to the frame 10 for swinging it upwardly and downwardly. A suitable clamp screw 14 is mounted on the support 2 for clamping engagement with the rear margin of the frame 10 for holding the frame 10 in selected rocked positions relative to the elevating support 2 about the axis of the pivot 11.

The frame 10 is arranged to support a carrier 15 for the profile follower. For this purpose frame 10 is provided with notched parallel guides 16 carrying balls 17 which antifrictionally support and guide the carrier 15 for movement lineally of the frame 10 in a direction generally toward and away from the platform 7. The balls 17 are preloaded so as to hold the carrier 15 precisely in its preselected lineal path.

For supporting the follower on the carrier 15 for movement therewith along said path and for concurrent rocking movement relative thereto in coplanar paths angularly disposed to said lineal path, a suitable bracket 19 is fixedly mounted on the carrier 15 and in turn, supports the follower. In the form illustrated, the bracket preferably comprises a pair of spaced arms 19a and 19b, as best illustrated in FIG. 2. The follower, indicated generally at 20, is pivotally supported by the arms 19a and 19b for rocking about an axis extending transversely of a path of the carrier 15. In the form illustrated, wherein the path of the carrier 15 is lineal and horizontal, the follower 20 is arranged to rock in a vertical plane. For this purpose, the follower is made in the form of a very long, rigid, hollow arm 21. Near one of its ends, the arm is fixedly secured to a transverse support 22, the ends of which are pivotally connected to the arms 19a and 19b respectively, by means of very thin leaf springs 22a secured at their inner adjacent ends to the support 22 and having their outer ends secured in the arms 19a and 19b, respectively, thus providing a rocking axis 23 for the arm.

The arm 21 extends forwardly, in the advancing direction of the carrier 15, beyond the frame 10 and at its forward end carries a follower head 24. Mounted on the forward end of the head 24 is a follower blade 25. The portion of the arm, from its pivotal axis to the blade, is extremely long so that, within the normal rocking limits of the arm, the blade travels substantially lineally in a path tangent to an arc through the pivot axis and article engaging surface of the blade 25. The blade 25 is adapted to rest at its lower edge on the surface of an article of which the profile is to be taken; for example, the surface of an internal thread of the pipe coupling "P." It is desirable that the blade 25 rest very lightly against the surface being profiled so that it can follow the profile without appreciable frictional resistance. Accordingly, means are provided for yieldingly urging the blade 25 against the surface of which the profile is to be taken. In the form illustrated, in which the arm 21 rocks about the horizontal axis 23, the means provided may be gravity. Otherwise, such means may be a spring. In any event, the arm with the head 24 and blade 25 thereon, are counter balanced so that the blade 25 rests with the very light degree of pressure desired on the surface of which the profile is being taken. When gravity is used for applying the blade 25, the counterbalance may be in the form of a weight 28 mounted on the arm 22 at the opposite side of the axis pivot 23 from the blade 25. The counterbalance weight 28 is slidable along the arm 21 to adjusted positions and is secured in adjusted positions by a clamping screw 29. Consequently the weight may be used to counterbalance different sizes, shapes of heads, blades, and the like.

It is necessary to produce a signal in response to the movements of the blade 25 in its coplanar paths transversely of the path of advance of the blade 25 as the carrier 15 is advanced. For this purpose, a transducer 30 is mounted on the carrier 15 with the axis of its operating winding upright and with its armature 32 connected by a suitable bracket 33 to the arm 21, preferably at a location between the axis 22 and the blade 25. The armature 32 may be connected directly to the head 24 or some other portion of the arm, if desired. The winding of the transducer 30 is connected to the usual feedback system of a conventional amplifying recorder 35, which is provided with the usual travelling recording tape 36 engaged by a recording stylus that records in amplified or reduced size the profile of the surface being traversed by the blade 25.

Normally amplification is used to render detection of deviations in contours of the surface more readily detectible. However for very large surfaces, it may be desirable to reduce the profile to a small scale for ease in recordation.

For accuracy in recordation it is desirable that the relative advance of the carrier 15 and platform 7 be very accurately controlled. Accordingly a micro-feed is provided and includes a micrometer screw 40 which is received in a rotatable internally threaded micronut 41. One end of the screw 40 is secured by a bracket 42 to carrier 15. The other end passes through an element 43 which is rigid with the frame 10. A tension spring 44 interconnects the bracket 42 and element 43 so as to yieldably urge the carrier 15 in a return direction and eliminate slack.

The nut 41 is driven through suitable belt 47 by a train of reduction gears 48 which, in turn, are driven by a reversible direct current motor 49. Thus upon operation of the motor in one direction, the carrier 15 is moved in the advancing direction and upon reversal of the motor it is moved in the return direction.

It is desirable to stop the drive automatically when the carrier 15 reaches a predetermined advance position and to effect immediate return of the carrier to its fully retracted or return position. For this purpose, switches 50 and 51 are mounted on the frame 10 and are arranged to be engaged by trigger fingers 52 and 53, respectively, on and movable with the carrier 15. The microswitch 50, which stops the advance movement and initiates return, and its trigger finger may be arranged for changing the advance position to that desired. For example, their effective positions may be varied by an adjusting screw 54 carried by the trigger finger 52.

The carrier 15 is started in the advance position by a suitable push button starter, as will later be described. When it advances to its fully advanced position, the switch 50 is tripped by its trigger finger 52 for reversing the motor, thereby causing the carrier 15 to stop and return towards starting position. When the carrier 15 reaches a fully returned position, the trigger finger 53 operates the switch 51 to stop the motor and thereby the travel of the carrier 15. In some cases, particularly such as illustrated in FIG. 9, it is necessary for the blade 25 to engage undercut surfaces such as indicated at S1, facing away from the advancing blade. The surface illustrated is a thread flank which is inclined from base of the crest at an angle of about 10° in the direction of advance. Normally, if the arm 21 were substantially horizontal and swinging so that the blade travelled in a vertical plane, it could not engage the undercut surface with a unidirectional advance of the carrier 15. However, it is apparent from FIG. 9, that the arm 21 is tilted downwardly sufficiently from its pivot point 23 toward the blade 25 so that, as it is advancing to the left in FIG. 9 the blade can swing beneath and engage the surface S1. In order to obtain this relation, means are provided for raising the carrier 15 to different elevations relative to the support and for changing its path of advance. The carrier can be raised in a number of ways, for example, by operation of the worm 4 to raise the support 2, relative to the platform 7, thus effecting a relative change in elevation of the platform 7 and support 2. Of course, the same result can be obtained by lowering the platform 7. In order to change the path of advance of the carrier, the frame 10 is mounted on the elevating support 2 for swinging movement upwardly and downwardly about an axis parallel to the pivotal axis 23. This mounting is provided by pivot 11 heretofore described, and swinging movement is through manipulation of the screw 12.

This provides an extremely simple structure which, since the pivot 11 is a considerable distance forwardly from the pivotal axis 23 of the arm 21, permits a considerable change in the angular disposition of the path of relative approach of the carrier 15, toward the platform 7. Again, if desired, one could move platform 7 toward the frame 10 rather than move the carrier 15 toward platform 7, but it is preferred to use the structure illustrated so the device can be transported for use in connection with various types of tables in various locations.

Again it happens that the blade must rise along a steep surface against which it is being advanced. Quite often the angle is so steep that normally the blade would jam thereagainst due to frictional resistance and would not ride up over the surface. To eliminate this difficulty, a vibrator is provided. It comprises suitable high frequency winding or coil 55, having a pole piece 56, and is mounted on the head 24. A blade support 57 in the form of an armature is connected to the head 24 for rocking about a horizontal axis. In the form illustrated, this is accomplished by connecting the support 57 and head 24 by a leaf spring 58. The vibrator coil 55 is electrically connected to the secondary of a step-up high frequency transformer 59 which, when energized, causes a very high frequency vibration of the support 57 and thereby the blade 25. This vibration may be maintained during the advance of the follower, and when so maintained reduces to a negligible amount any frictional resistance and assures the climbing of the blade up the steep inclined surfaces against which it would otherwise bind and lock.

To guard against jamming of the blade accidentally, suitable retracting means are provided. The retracting means may comprise a lever 60 pivotally connected by a bracket 61 to one of the guides 16 on frame 10 for swinging in a vertical plane. One end of the lever 60 extends forwardly beyond the frame 10 for access for manipulation by the hands of an operator. The lever 60 is urged in a clockwise direction in FIG. 1 by means of a tension spring 62, connected to the lever near one end. The opposite end of the lever is connected to a solenoid lift, indicated generally at 63, and comprising a coil 64, plunger 65. The plunger 65 is provided with a slot 66 through which the flattened end 67 of the lever 60 extends. Rocking of the lever 60 clockwise in FIG. 1 forces the solenoid plunger 61 downwardly against the arm 21 at the opposite side of the pivot 23 from the blade 25, thereby rocking the arm clockwise to lift the blade 25 out of engagement with the threaded surface of the coupling "P." On the other hand, when the solenoid is energized, its plunger 65 rises, overcoming the spring 62, and releasing the arm 21 for rocking movement about its axis 23.

Figure 11:
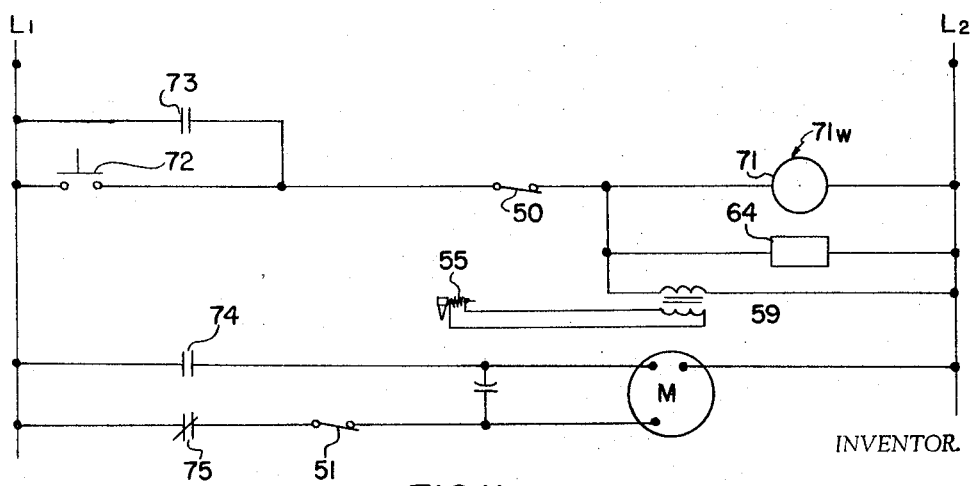
FIG. 11 is a simplified wiring diagram showing the manner in which the follower is advanced, lifted, and retracted automatically.

For automatic operation, the circuit shown in FIG. 11 is provided. As there illustrated, a relay 71, having a winding 71w, is connected across a 110 volt source, L1 and L2, through the normally closed switch 50. A normally open push button starter 72 is connected in series with the switch 50 and winding 71w. The relay 71 has normally open contacts 73 and 74 and normally closed contacts 75. The normally open contacts 73 provide a holding circuit around the push button 72 when they are closed. Upon closing the starter, a circuit is maintained through the winding 71w until the circuit is broken by opening of the switch 50. The solenoid coil 64 is connected in parallel with the relay winding 71w, and in series between the line L2 and the switch 50. Also connected parallel with the solenoid 64 and relay winding 71w, between the switch 50 and the line L2, is the high frequency step down transformer 59 which energizes the vibrating coil 55. Thus when the push button 72 is closed, the relay 71 is operative to close the normally open contacts 73 and 74 and open the normally closed contact 75. This establishes a holding circuit around the push button 72 to maintain energization of the relay 71 when the push button is released, and at the same time connects the motor so as to cause driving of the carrier 15 in the advance direction and energizing the solenoid 64, so that it releases the arm 21 and the relay permits the blade 25 to engage the surface of the threads of the coupling P. The vibrator is also energized at the same time by energization of the primary transformer 59. The motor M continues to drive in the advancing direction until the most advanced position of the blade is reached, whereupon the screw 54 of the trigger finger 52 on the carrier 15 strikes switch 50 and opens it, thereby breaking the circuit which energizes the relay 71. Upon deenergization of the relay 71, contacts 73 and 74 reopen and 75 closes. This contact is connected in series with the switch 51 which is normally closed. The motor then operates in reverse to retract the carrier 15 until trigger finger 53 strikes and opens switch 51. Thereupon the motor stops and the circuitry is ready to repeat the cycle upon closing the push button 72. The solenoid 64 is deenergized at the instant the advance is discontinued and switch 50 is opened. Thereupon lever 60 is operated by a spring 62 to rock the arm 21 in the direction to lift the blade 25 from the surface of the coupling P.

It is apparent that with the structure and circuits described, arrangement is made to provide relative movement of the follower and article support toward each other in a predetermined path. Concurrently therewith, the follower is moved in coplanar paths transversely of the predetermined path.

The cycle of operation, when started, is continued to completion, whereupon the follower blade is lifted to inoperative position and returned to starting position, awaiting replacement of another article for profiling on the platform 7.

Since pipe threads have pitch, the throat or the crest of the thread does not extend at 90° to the axis of the thread, and hence in a path normal to the direction of advance. Instead, there is a slight obliquity relative thereto, depending upon the degree of pitch. If the blade is relatively wide edgewise, and it is desirable to have it such, and if the pitch is very great, a lateral edge of the blade, at the tip of the portion which is to ride on the surface, could engage a flank surface. The platform 7 is connected by the pivot 8 to the post 6 as mentioned, by a vertical pivot which intersects the axis of the coupling P. Hence the platform 7 can be swung a very slight amount on its pivot, thus bringing the pitch line of the threads normal to the direction of advance of the blade 25. This prevents any binding of the blade and gives an essentially true profile or one in which allowance can be made for the angular adjustment of the platform.

On the other hand, if it is desirable to use a very fine pointed stylus, this adjustment is not necessary.

As mentioned heretofore the arm 21 is hollow consequently the wiring for the vibrator extends therethrough from end to end. The wiring between the transducer 30 and the amplifying recorder 35 is conventional and includes the usual feed back system whereby a reference signal is varied by the feedback of the transducer.

As is apparent from FIGS. 12 through 14, the surface engaging edge of the blade 25 and the pivot 23 are positioned so that a line therethrough is parallel to the path of advance, indicated by the arrow A, of the carrier 15. This relation is obtained for a given article, by adjusting the height of the support 2 relative to the platform 7 and tilting of the frame 10 about the axis of the pivot 11. Thus in all cases, due to the distance of the blade 25 from the rocking axis 23 and the mounting of the arm on the carrier 15, the article engaging edge of the blade moves transversely of the path of advance in substantially lineal paths normal to the path of advance. Due to the great distance of the blade 25 from the pivotal axis 23, the mounting of the arm 21 on the carrier, and the angular adjustment of the path of advance of the carrier, the article engaging edge moves at all times in almost lineal coplanar paths disposed at an angle of substantially 90° to the line of advance.

In some cases, resonance and harmonics may develop due to the vibrator. For limiting such vibrations to a neglible amplitude, a damper is provided. As illustrated in FIG. 15, the damper may comprise a container 80 containing a viscous liquid 81, such as a light silica jell, with which a finger 82, mounted on the arm 21 for rocking therewith, is engaged. The finger may be carried on the arm 21, as illustrated, or on the blade support or armature 57.

Having thus described my invention, I claim:
1. A profile indicator comprising an article supporting member having an article supporting surface,
   a carrier member,
   supporting means supporting the members for movement relatively toward and away from each other along a predetermined path,
   an elongated rigid rod,
   leaf spring pivot means pivotally connecting the rod, at a fixed location between the ends of the rod, to the carrier member and supporting the rod on the carrier member for rocking relatively to the carrier member in a plane extending endwise of said path and intersecting said surface, about a fixed axis extending transversely of said path at a right angle to said plane, toward and away from said article supporting surface, a follower mounted on one end of the rod for movement therewith and adapted to ride on the surface of an article supported on the article supporting member during relative movement of the members along said predetermined path, signal producing means operatively connected to the follower and operated thereby in response to the positions to which the follower is moved in said plane, means operative in response to signals from said signal producing means to indicate the profile of an article being traversed by said follower, a counter-balance on the rod at the opposite side of the pivot means from the follower, yieldable resistance vibration damping means operatively connected to the follower for limiting the amplitude of vibration thereof, and means for moving the members relative to each other along said path.

2. The structure according to claim 1 wherein the yieldable resistance vibration damping means include means supported by the rod and cooperable means supported by the carrier member.

3. The structure according to claim 1 wherein the yieldable resistance vibration damping means include a container member, viscous fluid therein, and a cooperable member having a portion in contact with the fluid, one of said two last mentioned members being supported by the rod and the other of the two last mentioned members being supported by the carrier member.

4. The structure according to claim 1 characterized in that a high frequency vibrator is drivingly connected to the follower for causing the follower to vibrate at high frequency during said movements of the follower.

5. The structure according to claim 1 wherein the supporting means support the carrier member for movement relative to the supporting means along said predetermined path and about an axis parallel to and offset from the axis of said pivot means to selected rocked positions to change the angle of said predetermined path, and means are provided to secure the supporting means in selected ones of the rocked positions of the carrier member.

References Cited by the Examiner
UNITED STATES PATENTS

| | | | |
|---|---|---|---|
| 2,372,427 | 3/1945 | Johnson | 33—174 X |
| 2,539,027 | 1/1951 | Marchant | 33—23 |
| 2,633,020 | 3/1953 | Abbott | 33—174 X |
| 2,706,340 | 4/1955 | Johnston | 33—174 X |
| 2,844,879 | 7/1958 | Roeger | 33—174 |
| 2,859,529 | 11/1958 | Aller et al. | 33—174 |
| 3,034,219 | 5/1962 | Bregi | 33—179.5 |
| 3,193,940 | 7/1965 | Jenkins | 33—174 |

LEONARD FORMAN, *Primary Examiner.*

S. S. MATTHEWS, *Assistant Examiner.*